(12) United States Patent
Wischnack et al.

(10) Patent No.: US 11,046,195 B2
(45) Date of Patent: Jun. 29, 2021

(54) APPARATUS FOR TRANSMITTING ENERGY AND INFORMATION BY MEANS OF A CHARGING CABLE FOR AN ELECTRIC VEHICLE

(71) Applicant: Dr. Ing. h.c. F. Porsche Aktiengesellschaft, Stuttgart (DE)

(72) Inventors: Thomas Wischnack, Karlsruhe (DE); Jari Rönfanz, Stuttgart (DE); Steve Zander, Marbach am Neckar (DE); Jakob Brömauer, Pfinztal (DE); Jan Spindler, Lahr (DE); Stefan Götz, Forstern (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 662 days.

(21) Appl. No.: 15/962,450

(22) Filed: Apr. 25, 2018

(65) Prior Publication Data

US 2018/0334047 A1 Nov. 22, 2018

(30) Foreign Application Priority Data

May 19, 2017 (DE) .......................... 102017110956.0

(51) Int. Cl.
*H02J 7/00* (2006.01)
*H02J 7/14* (2006.01)
*B60L 53/14* (2019.01)
*H01B 9/00* (2006.01)
*B60L 53/18* (2019.01)
(Continued)

(52) U.S. Cl.
CPC ............... *B60L 53/14* (2019.02); *B60L 53/18* (2019.02); *B60L 53/66* (2019.02); *H01B 9/003* (2013.01); *H01B 9/029* (2013.01)

(58) Field of Classification Search
USPC .......................................................... 320/109
See application file for complete search history.

(56) References Cited

U.S. PATENT DOCUMENTS

2006/0137890 A1 6/2006 Berens et al.
2011/0121779 A1 5/2011 Ichikawa et al.
(Continued)

FOREIGN PATENT DOCUMENTS

| CN | 1797884 A | 7/2006 |
|---|---|---|
| CN | 205069202 U | 3/2016 |
| DE | 102011106903 A1 | 6/2012 |

OTHER PUBLICATIONS

SEW Eurodrive, http://www.seweurodrive.com. 2018, 1 page.
(Continued)

*Primary Examiner* — Alexis B Pacheco
(74) *Attorney, Agent, or Firm* — RatnerPrestia

(57) ABSTRACT

An apparatus for transmitting energy and information includes at least one first electrical conductor configured to transmit a charging current of a charging system for an electric vehicle, a second electrical conductor configured as a protective conductor of the charging system, a third electrical conductor configured to transmit a control pilot signal, and a fourth electrical conductor configured to transmit a counterconductor signal. The apparatus has a transmission device, which is configured to transmit the information as a differential signal of the control pilot signal and the counterconductor signal.

11 Claims, 3 Drawing Sheets

(51) Int. Cl.
   *B60L 53/66*   (2019.01)
   *H01B 9/02*   (2006.01)

(56) References Cited

U.S. PATENT DOCUMENTS

| | | | | |
|---|---|---|---|---|
| 2011/0127956 | A1* | 6/2011 | Mitsutani | B60W 10/26 |
| | | | | 320/109 |
| 2012/0091958 | A1* | 4/2012 | Ichikawa | B60L 3/0046 |
| | | | | 320/109 |
| 2012/0206100 | A1* | 8/2012 | Brown | B60L 3/0069 |
| | | | | 320/109 |
| 2013/0154667 | A1 | 6/2013 | Scheu et al. | |
| 2013/0300429 | A1* | 11/2013 | Jefferies | B60L 53/31 |
| | | | | 324/511 |
| 2014/0355698 | A1 | 12/2014 | Morand | |
| 2015/0097525 | A1 | 4/2015 | DeDona et al. | |
| 2016/0033565 | A1* | 2/2016 | Reid | B60L 3/0046 |
| | | | | 324/503 |
| 2016/0138980 | A1* | 5/2016 | Jefferies | G01K 13/00 |
| | | | | 374/141 |
| 2016/0207412 | A1* | 7/2016 | Krammer | B60L 53/305 |
| 2016/0250939 | A1* | 9/2016 | Shin | B60L 53/18 |
| | | | | 320/109 |
| 2016/0325636 | A1* | 11/2016 | Masuda | B60L 58/20 |
| 2017/0057358 | A1* | 3/2017 | Nakagawa | H04B 3/00 |
| 2017/0158068 | A1* | 6/2017 | Dowell | B60L 53/18 |
| 2017/0166073 | A1* | 6/2017 | Park | B60L 53/66 |
| 2018/0138721 | A1* | 5/2018 | Wu | B60L 53/66 |
| 2018/0326854 | A1* | 11/2018 | Okada | B60L 53/14 |
| 2018/0361862 | A1* | 12/2018 | Hein | B60L 53/66 |

OTHER PUBLICATIONS

German Search Report for Application No. 10 2017 110 956.0, dated Feb. 5, 2018 with partial English translation, 9 pages.
Chinese Office Action for Chinese Application No. 2018104631699, dated Mar. 1, 2021, 8 pages.
Li et al., "IEEE 1394 Interface Technology", National Defense Industry Press, Jul. 2004, 2 pages.
Universal Serial Bus. System Architecture Second Edition, MindShare, Inc., China Electric Power Press, Sep. 2003, 4 pages.
Hao, "Design and Application of Electromagnetic Compatibility of Power Supply System", China Electric Power Press, 2007, 3 pages.

* cited by examiner

APPARATUS FOR TRANSMITTING ENERGY AND INFORMATION BY MEANS OF A CHARGING CABLE FOR AN ELECTRIC VEHICLE

CROSS-REFERENCE TO RELATED APPLICATION

This application claims priority to German Patent Application No. DE 10 2017 110 956.0, filed May 19, 2017, which is incorporated by reference herein in its entirety.

FIELD OF THE INVENTION

The invention relates to an apparatus for transmitting energy and information by means of a charging cable for an electric vehicle.

BACKGROUND OF THE INVENTION

For a charging process, an electric vehicle is connected to an AC voltage or a three-phase socket of a charging station, for example by means of a suitable charging cable. Charging using direct current from a charging station is likewise possible.

A communication for the control of a charging process takes place between the charging station and the electric vehicle by means of signals, which are transmitted by means of at least one separate signal conductor. The at least one signal conductor is likewise arranged in the charging cable. For example, a control pilot, that is to say a control pilot signal, and its reverse conductor, that is to say a counterconductor signal are used in accordance with the charging standard Combined Charging System, CCS.

U.S. 2014 355 698 A1, which is incorporated by reference herein, discloses, in this respect, a communication for the transmission of data by means of a powerline communication in the high-frequency range and a control pilot in the low-frequency ramie, which are jointly coupled into a signal line for the control pilot.

U.S. 2011 121 779 A1, which is incorporated by reference herein, discloses a control pilot circuit of a charging cable. U.S.2011127956 A1, which is incorporated by reference herein, discloses a charging appliance. U.S. 2013 154 667 A1 which is incorporated by reference herein, and U.S. 2015 097 525 A1, which is incorporated by reference herein, disclose methods for identifying a charging cable and a charging appliance, respectively. U.S. 2016 138 980 A1, which is incorporated by reference herein discloses a charging station. In the mentioned documents, data is likewise sent by means of control signals.

Charging currents flowing through the charging cable can disturb the communication. The at least one signal conductor is therefore electromagnetically shielded in order to minimize such disturbances. An appropriate shield is usually connected on both sides, that is to say to the electric vehicle and to the charging station.

For reasons of safety, an equipotential bonding conductor is also arranged in the charging cable. For example, a protective conductor, in particular in accordance with EN 61851, is used. Said, protective conductor fixes a vehicle body of the electric vehicle at a stable, safe potential. Fault currents are safely discharged even in the event of a fault so that nobody can be endangered.

In the known charging systems, therefore, there are generally a plurality of parallel paths for the potential equalization, for example the protective conductor, the shield and possibly the reverse conductor of the control pilot.

Forming a ground loop can therefore lead to uncontrollable in-coupling of disturbances.

Particularly due to the parallelism of the reverse line of the control pilot and of the equipotential bonding conductor, an analog signal, which is present for the communication on the reverse line of the control pilot, can also crosstalk via the grounding system to any other systems.

In addition, potential equalization currents, which bring the body of the vehicle to ground potential and keep it there, flow not only via the equipotential bonding conductor, which is generally thicker by orders of magnitude, but a high proportion also flows via the reverse conductor of the control pilot. As a result, said currents can disturb the communication of the control pilot and lead to difficulties in detecting the communication signals.

SUMMARY OF THE INVENTION

In view of the foregoing, it is therefore desirable to specify an apparatus for charging electric vehicles that is improved with respect thereto.

In this case, an apparatus for transmitting energy and information is provided, comprising at least one first electrical conductor, designed to transmit a charging current of a charging system for an electric vehicle, a second electrical conductor, designed as a protective conductor of the charging system, a third electrical conductor, designed to transmit a control pilot signal, and a fourth electrical conductor, designed to transmit a counterconductor signal, wherein the apparatus has a transmission device, which is designed to transmit the information as a differential signal of the control pilot signal and the counterconductor signal. A short-term potential shift does not have a disturbing effect on the signal evaluation due to the differential signal since the average value of the two signals (common mode) is irrelevant for the signal evaluation. This improves the robustness of the charging system.

The third electrical conductor and the fourth electrical conductor are advantageously DC-isolated from the protective conductor. This prevents a flow of current between the communication lines and the potential equalization line that possibly disturbs the communication.

BRIEF DESCRIPTION OF THE DRAWINGS

Further advantageous refinements emerge from the dependent claims, the following description and the drawing.

In the drawing

DETAILED DESCRIPTION OF THE INVENTION

Figure 1:
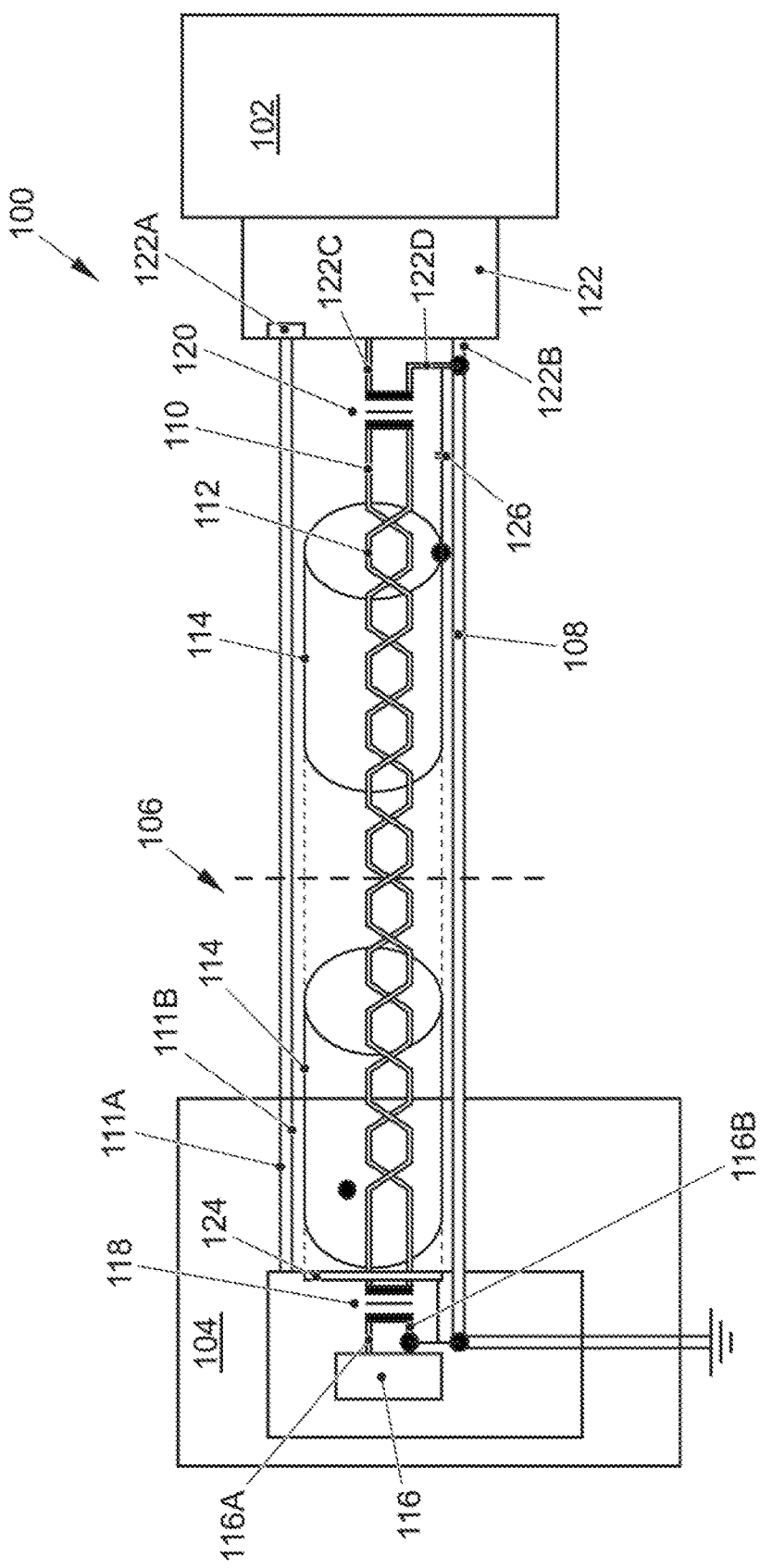
FIG. 1 schematically shows part of charging system of a first embodiment.

FIG. 1 schematically shows a charging system 100 for an electric vehicle 102. The charging system 100 comprises a charging station 104, which can be connected to a power supply. The power is supplied by a power supply system, for example. The charging station 104 can be connected to the electric vehicle 102, for example, by means of a charging cable 106. The charging process is carried out, for example, in accordance with the charging standard Combined Charging System, CCS. This standard specifies a Type 2 vehicle coupling or a Combo 2 vehicle coupling, that is to say a Type 2 vehicle coupling with two additional DC poles. In general, two charging methods are possible using such charging systems: an alternating current charging, AC charging, and a direct current charging, DC charging. An exemplary configuration of contacts of a plug in the case of DC charging by means of a Combo 2 vehicle coupling provides contacts for the following conductors:

protective conductor, PE, 108,
control pilot, CP, 110 (a conductor for dialog between charging station and vehicle by means of analog signal),
DC charging positive pole, DC+, 111A,
DC charging negative pole, DC−, 111B.

The control pilot 110 is an example of an electrical conductor, which is designed to transmit a control pilot signal.

The protective conductor 108 can be used in the communication between the charging station 104 and the electric vehicle 102 as a reverse conductor for the control pilot; it can also be used as a separate reverse conductor 112 for the control pilot 110, as illustrated in FIG. 1.

The reverse conductor 112 is an example of an electrical conductor, which is designed to transmit the counterconductor signal.

In order to minimize disturbances on the control pilot 110 and, where appropriate, its reverse conductor 112, these are mostly provided with a shield 114, that is to say a line shield or a plurality of line shields, as is known in the prior art. The shield 114 is mostly electrically conductively connected on both sides, that is to say to the electric vehicle 102 and to the charging station 104 of the charging system, when the charging cable 106 is plugged into the electric vehicle 102.

For reasons of safety, the charging system has, for example in accordance with EN 61851, an equipotential bonding conductor, for example the protective conductor 108. Said equipotential bonding conductor fixes a vehicle body at a stable, safe potential. Fault currents are safely discharged even in the event of a fault so that nobody can be endangered.

In the known charging systems, the protective conductor 108, the shield 114 and, where appropriate, the reverse conductor of the control pilot 112 form a plurality of parallel paths for the potential equalization.

In contrast to known charging systems, the apparatus for transmitting energy comprises at least one first electrical conductor, which is designed to transmit a charging current of the charging system 100 for the electric vehicle 102. In the example, these are the conductors for DC charging positive pole, 111A, and DC charging negative pole, 111B. The apparatus also comprises a second electrical conductor, designed as a protective conductor 108 of the charging system 100. The apparatus also comprises a third electrical conductor, designed to transmit a control pilot signal, CP+, for example the control pilot 110, and a fourth electrical conductor, designed to transmit a counterconductor signal, CP−, for example the reverse conductor of the control pilot 112. These are arranged in the charging cable 106. The apparatus also has a transmission device 116, which is designed to transmit a piece of information, that is to say signals for communication between the charging station 104 and the electric vehicle 102, as a differential signal of the control pilot signal CP+ and the counterconductor signal CP−. As a result, a reliable signal evaluation is possible even in the case of short-term potential shifts, since the average value of the two signals (common mode) is irrelevant therefor. The control pilot signal CP+ and the counterconductor signal CP− thereof are converted to a differential signal for this purpose, such that the information is now located in the difference between the two conductors, that is to say CP+ and CP−.

The differential signal is converted on both sides of the charging cable 106 using inductive measuring transducers. Said inductive measuring transducers are realized, for example, by coupling members. The signals on the side of the charging station are preferably generated symmetrically around a ground potential, such that (CP+)+(CP−)=0 volts results on this side. Capacitive charges can be prevented thereby. In this case, on the vehicle side, there is no DC connection between one of the signals and any vehicle potential.

Transmission devices 116 can be used, as are known, for example, from the Ethernet standard. An active differential driver or transceiver circuit can preferably be used at least on the side of the charging station in order to improve the signal quality.

In one embodiment, there is provision for the third electrical conductor and the fourth electrical conductor to be DC-isolated from the equipotential bonding conductor. As illustrated in FIG. 1, the control pilot 110 and the reverse conductor of the control pilot 112 is DC-isolated from the protective conductor 108 by a first coupling member 118 and a second coupling member 120. As a result, there is no flow of current between said lines and the electric vehicle 102.

DC isolation is understood in the following text as meaning the prevention of an electrical line between two conductors, between which power or signals are exchanged. In the case of DC isolation, electrical potentials are also isolated from one another.

Instead of an electrically conductive connection, the coupling members 118, 120 are used. The coupling members 118, 120 are used for transmitting power or signals. For example, the standard CP+, CP− signals are converted to the differential signal and vice versa in this way.

In order to charge the electric vehicle 102, the charging station 184 and a battery of the electric vehicle 102 are connected by means of high-power lines, in the example the mentioned DC lines 111A, 111B. Generally, in direct current, DC, or in alternating current, AC, two high-power lines, and in three-phase current, three high-power lines, are used as the at least one electrical conductor.

In order to transmit information, a communication is established, for example, between the charging station 104 and the electric vehicle 102 for the purpose of data exchange, the battery of said electric vehicle being connected to the charging station 104. To this end, a separate signal is used, which is transmitted as the differential signal.

The separate signal is transmitted, for example, in accordance with a powerline communication, PLC, with a typical spectral range of approximately 2 MHz to 30 MHz. For CCS, this is an analog signal. As a result, filter-free, typical operating means, for example switches, contactors, plugs, etc., can be bypassed with little attenuation. The propagation of the signal is only prevented to a small extent in the interests of a good communication. A spectral range used for PLC and modulation methods, for example OFDM, QAM, etc., used for the communication are known from digital radio transmission technology.

The separate signal is transmitted by the coupling members 118, 120. A situation in which the separate signal overcouples into adjacent conductors in a simple capacitive and/or inductive manner is also prevented. This prevents problems in the PLC that can arise in charging parks, in which a multiplicity of charging stations 104 at least partly feed from a common power electronics system or are connected to a common system connection. More precisely, a situation in which the communication signals of a charging station 104 couple into adjacent lines by means of a ground fault is prevented. This would be effected directly by the spatial proximity of lines or by means of the common system connection, transformer, fuses or other operating means. A charging station 104 can thus ensure that it communicates with the electric vehicle 102 connected thereto. For example, a charging station 104, which establishes a communication with the already connected electric vehicle 102, can thus be sure that its own signal is received only by the directly connected electric vehicle. Furthermore, the charging station 104 can be sure that the responses originate from the connected electric vehicle 102 and not from an adjacent electric vehicle at another charging station.

The communication conductors, which transmit, inter alia, the PLC, are also generally less sensitive to interference phenomena as a result.

In FIG. 1, a ground reference is established between the transmission device 116 and the second coupling member 118 on the side of the charging cable 106, which faces toward the connector 122.

FIG. 1 schematically shows an advantageous embodiment in which the electric shield 114 is electrically conductively connected to the protective conductor 108.

For example, the electrical shield 114 is preferably extensively electrically conductively connected at a side facing toward the charging station 104 to the protective conductor 108. An area 124 therefor is schematically illustrated in FIG. 1.

Alternatively or in addition, the electrical shield 114 is preferably capacitively connected at a side facing away from the charging station 104 to the protective conductor 108 or to the fourth electrical conductor 112. In FIG. 1, a corresponding capacitor 126 connects the shield 114 to the protective conductor 108.

Figure 2:
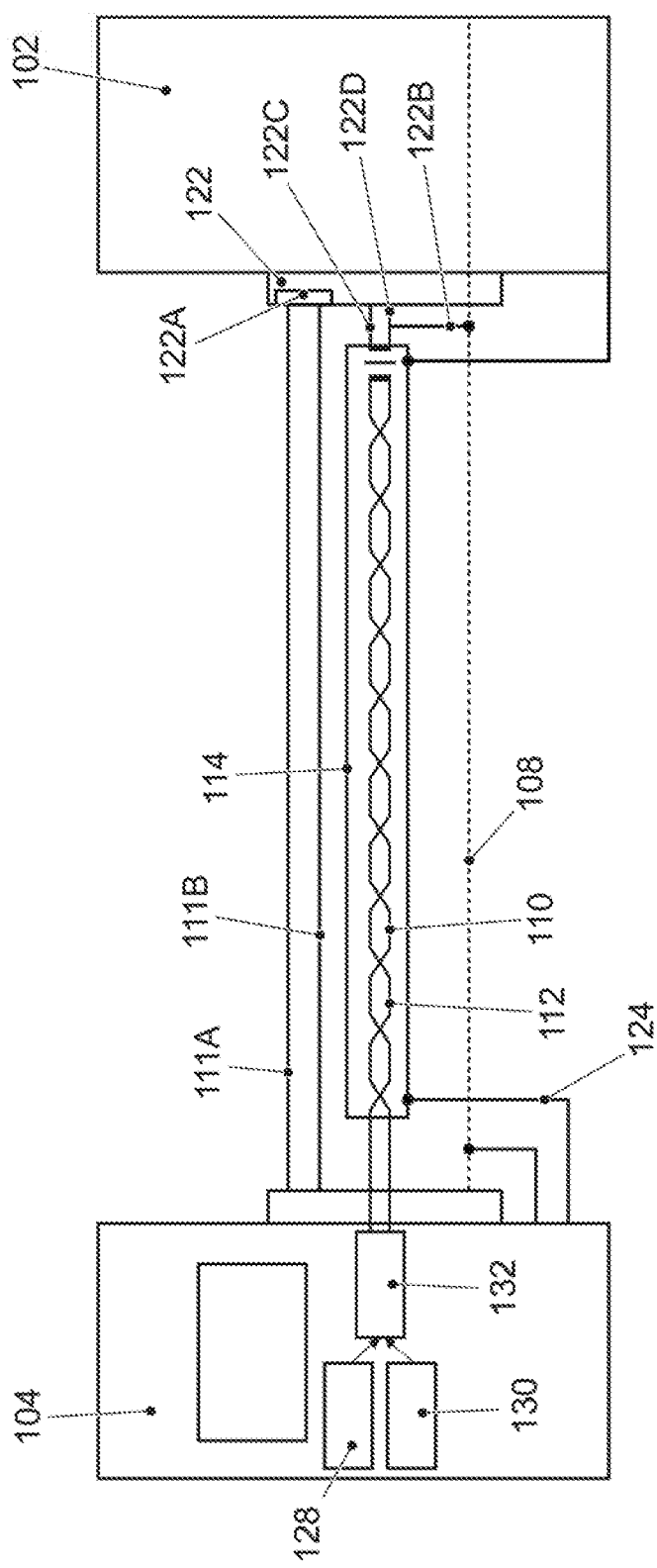
FIG. 2 schematically shows part of a charging system of a second embodiment.
Figure 3:
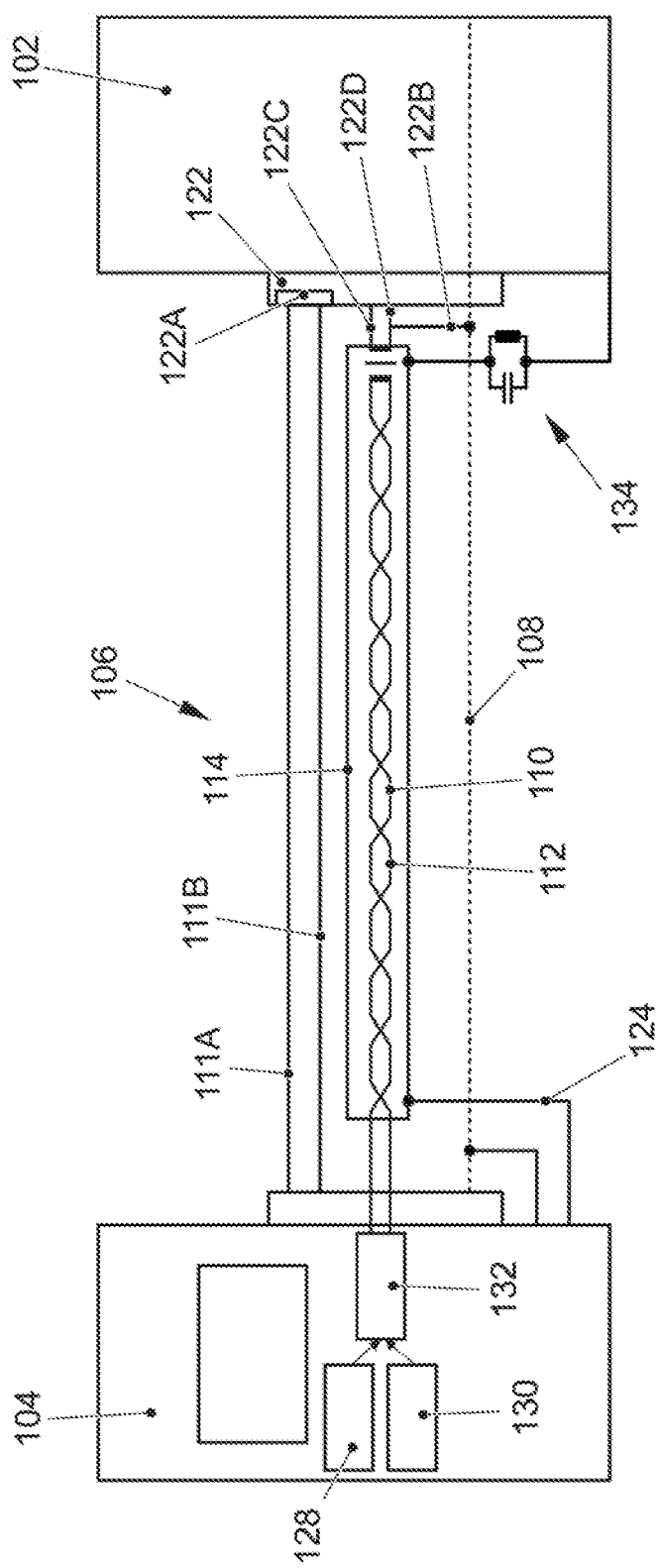
FIG. 3 schematically shows part of a charging system of a third embodiment.

FIG. 2 schematically shows part of a charging system of a second embodiment, FIG. 3 schematically shows part of a charging system of a third embodiment. Components with a corresponding functionality are denoted and arranged in FIG. 2 and FIG. 3 as described in FIG. 1.

In accordance with the second and the third embodiment, the ground reference is established behind the second coupling member 120, that is to say between the second coupling member 120 and the connector 122.

In this case, both in the second embodiment and in the third embodiment, only the second coupling member 120 is used. An active or passive transceiver 132 is provided as a transmitter on the side of the charging station 104, said transceiver transmitting signals but not DC-decoupling said signals from the third electrical conductor and fourth electrical conductor. A microchip, in particular a powerline communication chip, can be provided, on which the transmission device 116 is integrated. As illustrated in FIG. 2 and FIG. 3, separate microchips can also be provided as powerline communication module 128 and/or control pilot module 130, the signals of which are transmitted by the transceiver 132.

In the second embodiment, instead of the potential equalization between the shield 114 and the protective conductor 108, a potential equalization between the shield 114 and the electric vehicle 102 is directly established by means of the connector 122.

In the third embodiment, instead of the potential equalization between the shield 114 and the protective conductor 108, a potential equalization between the shield 114 and the electric vehicle 102 is directly established by means of a filter 134 and the connector 122.

The shield 114 is preferably connected, at least on one side, to ground by means of a frequency-selective filter 134. The filter 134 can be embodied as passive, for example as an RC parallel circuit on the vehicle side. The resistor R suppresses potential equalization currents in the case of DC and low frequencies in order to configure the shield to be of higher impedance than the equipotential bonding conductor, whereas the capacitance C permits a flow of current from a certain frequency (for example below 1 kHz), said flow of current being necessary for the shielding effect. More complex filter arrangements can accurately conduct the required frequency ranges and block others. The filter 134 can also optionally be embodied as active and, for example, be implemented with transistors or operational amplifiers. The shield can also optionally be connected on one side, for example not connected at all on the vehicle side, only by means of a capacitance or by means of a parallel circuit of capacitance and resistor, in order to prevent the conductor loop with the potential equalization.

The advantages achieved thereby are further improved by the following measures.

The third electrical conductor and the fourth electrical conductor are preferably embodied as a coaxial connection. For example, the control pilot 110 and the reverse conductor of the control pilot 110 are embodied as a coaxial connection in which the control pilot 110 surrounds the reverse conductor 112 or vice versa.

For example, the third electrical conductor and the fourth electrical conductor are embodied as a paired twisted connection. This is schematically illustrated in FIG. 1 for the control pilot 110 and the reverse conductor of the control pilot 110.

In the case of interference phenomena of both a capacitive and an inductive kind, it is assumed that the interference phenomenon is virtually of the same magnitude in the two conductors when the two conductors are guided physically very close to one another. When forming the difference, which takes place, for example, in the transmission device 116 or the transceiver 132, this predominantly identical amount, that is to say the common mode, is therefore completely suppressed, such that the remaining disturbance is generated only by the different interference phenomena in the two conductors.

This arrangement reduces the inductance of the current path in the conductors for CP+ and CP−. As a result, a cut-off frequency of the respective conductor, which is given approximately from the inverse of the product of inductance and capacitance of the conductor, is increased. This makes faster current edges at a finite impedance of the receivers possible and reduces a coupling inductance, that is to say a mutual inductance, and thus reduces the ability to absorb interference phenomena.

The third electrical conductor and the fourth electrical conductor are preferably surrounded by an electrical shield. This is illustrated in FIG. 1 for the shield 114 and the control pilot 110 and the reverse conductor of the control pilot 112.

The transmission device 116 advantageously has a first connection 116A for the control pilot signal CP+, which is connected to the third electrical line, in the example to the control pilot 110, in a DC-isolated manner. The transmission device 116 advantageously has a second connection 116B for the counterconductor signal CP−, which is connected to the fourth electrical line, in the example to the reverse conductor of the control pilot 110, in a DC-isolated manner.

The second connection 1165 is preferably electrically conductively connected to the protective conductor 108 and/or to the shield 114.

An electrical connector 122, for example based on one of the abovementioned CCS vehicle couplings, is preferably arranged on the first electrical conductor on its side facing away from the charging station 104. The electrical connector 122 has at least one first contact 122A for the at least one first electrical line. In the example, the DC charging positive pole, DC+, 111A, and the DC charging negative pole, DC−, 111B, are arranged as in the abovementioned CCS vehicle coupling.

The electrical connector 122 has a second contact 122B for the second electrical line, that is to say in FIG. 1 for the protective conductor 108. The electrical connector 122 has a third contact 122C for the third electrical line, that is to say in FIG. 1 for the control pilot 110. The third electrical line is connected to the third contact 122C by means of the second coupling member 120 in a DC-isolated manner. The electrical connector 122 has a fourth contact 122D for the fourth electrical line, that is to say in FIG. 1 for the reverse conductor of the control pilot 110. The third electrical line is connected to the fourth contact 122D by means of the second coupling member 120 in a DC-isolated manner. In the example, the fourth contact 122D is connected to the second contact 122B. In this case, the connector 122 also has just one contact on the side of the electric vehicle 102. For the electric vehicle 102, the mechanical interface is preferably identical to the interfaces in accordance with one of the mentioned standards. Loop formation in the potential equalization lines otherwise running in parallel in the charging cable 106 is prevented by the described measures. Electromagnetic interference is reduced as a result. This is achieved, inter alia, by virtue of the fact that the potential reference of the control pilot line 110 and of the shield 114 are DC-isolated. For the shield 114, this has the additional effect that a shielding effect is required only for the frequency range of the shielded signals. As a result, a potential equalization current can be prevented without impairing the shielding effect for the signals to be shielded. The shield 114 for the signal cables 110, 112 is required only in specific frequency ranges that do not correspond or only partly correspond to the typical frequency ranges of potential equalization currents or interference phenomena. In CCS charging systems, the dominant frequency ranges are, for example, at 1 kHz for the plug state monitoring process and at 3 MHz to 30 MHz for the PLC transmission.

At least one shield 114 does not enclose, in particular, the equipotential bonding conductor and does not enclose any charging current lines. This ensures that the attenuation between the latter and the signal lines 110, 112 is low.

The technical embodiments of said broken potential loops that are described are realized, for example, by means of capacitive coupling members, inductive coupling members, optical coupling members or similar coupling members. In this case, the control pilot signal does not have to be symmetrical, as described; another signal can also be used.

In a further embodiment, the shield 114 is designed to be frequency-selective. In this case, the shielding effect of the shield 114 is generated only at the frequencies that have to be transmitted to the shielded conductors 110, 112 or that have to be protected. This can be achieved, for example, by a corresponding frequency-selective filter in the electrically conductive connection of the shield 114 to the protective conductor 108, to the electric vehicle 102 and/or to the charging station 104 of the charging system. There is hardly any shielding effect in frequency ranges in which the filter conducts poorly and hence the shield 114 connects poorly. In particular, direct current on the shield 114 can be suppressed by means of the frequency-selective filter. This has the advantage that the shield 114 does not have to conduct potential equalization currents. For this, the shield 114 would have to have very large cross sections on account of the high currents for grounding the vehicle during the charging process. Potential equalization currents preferably flow via a distinct potential equalization line, for example a PE line in the charging cable. The shield 114 is not electrically connected in parallel with the potential equalization line due to the frequency-selective filter, said potential equalization line likewise having a large cross section. Therefore, the current is not split up by way of the resistance between the two. This prevents thermal overloading of the shield 114.

What is claimed is:

1. An apparatus for transmitting energy and information comprising:
    at least one first electrical conductor configured to transmit a charging current of a charging system for an electric vehicle,
    a second electrical conductor configured as a protective conductor of the charging system,
    a third electrical conductor configured to transmit a control pilot signal,
    a fourth electrical conductor configured to transmit a counterconductor signal,
    a transmission device configured to transmit the information as a differential signal of the control pilot signal and the counterconductor signal, and
    wherein the third electrical conductor and the fourth electrical conductor are surrounded by an electrical shield.

2. The apparatus as claimed in claim 1, wherein the third electrical conductor and the fourth electrical conductor are DC-isolated from the second electrical conductor.

3. The apparatus as claimed in claim 1, wherein the third electrical conductor and the fourth electrical conductor are embodied as a coaxial connection.

4. The apparatus as claimed in claim 1, wherein the third electrical conductor and the fourth electrical conductor are embodied as a paired twisted connection.

5. The apparatus as claimed in claim 1, wherein the electrical shield is electrically conductively connected to the second electrical conductor.

6. The apparatus as claimed in claim 1, wherein the electrical shield is extensively electrically conductively connected to the second electrical conductor.

7. The apparatus as claimed in claim 1, wherein the shield is capacitively connected to the second electrical conductor or to a contact for the fourth electrical conductor.

8. The apparatus as claimed in claim 1, wherein the transmission device has a first connection for the control pilot signal, said first connection being connected to the third electrical conductor in a DC-isolated manner, and wherein the transmission device has a second connection for the counterconductor signal, said second connection being connected to the fourth electrical conductor in a DC-isolated manner.

9. The apparatus as claimed in claim 8, wherein the second connection is electrically conductively connected to the second electrical conductor or to the electrical shield.

10. The apparatus as claimed in claim 1, wherein the electrical shield is frequency-selective, wherein a shielding effect of the electrical shield is created by a frequency-selective filter in a connection of the electrical shield to the second electrical conductor, to the electric vehicle or to a charging station of the charging system at frequencies transmitted to the third and fourth electrical conductors.

11. The apparatus as claimed in claim 1, further comprising an electrical connector having (i) a first contact for the at least one first electrical conductor, (ii) a second contact for the second electrical conductor, and (iii) a third contact for the third electrical conductor that is arranged on one side of the electrical conductors,
    wherein the third electrical conductor is connected to the third contact in a DC-isolated manner, and wherein the fourth electrical conductor is connected to the fourth contact in a DC-isolated manner.

* * * * *